Figure 1:
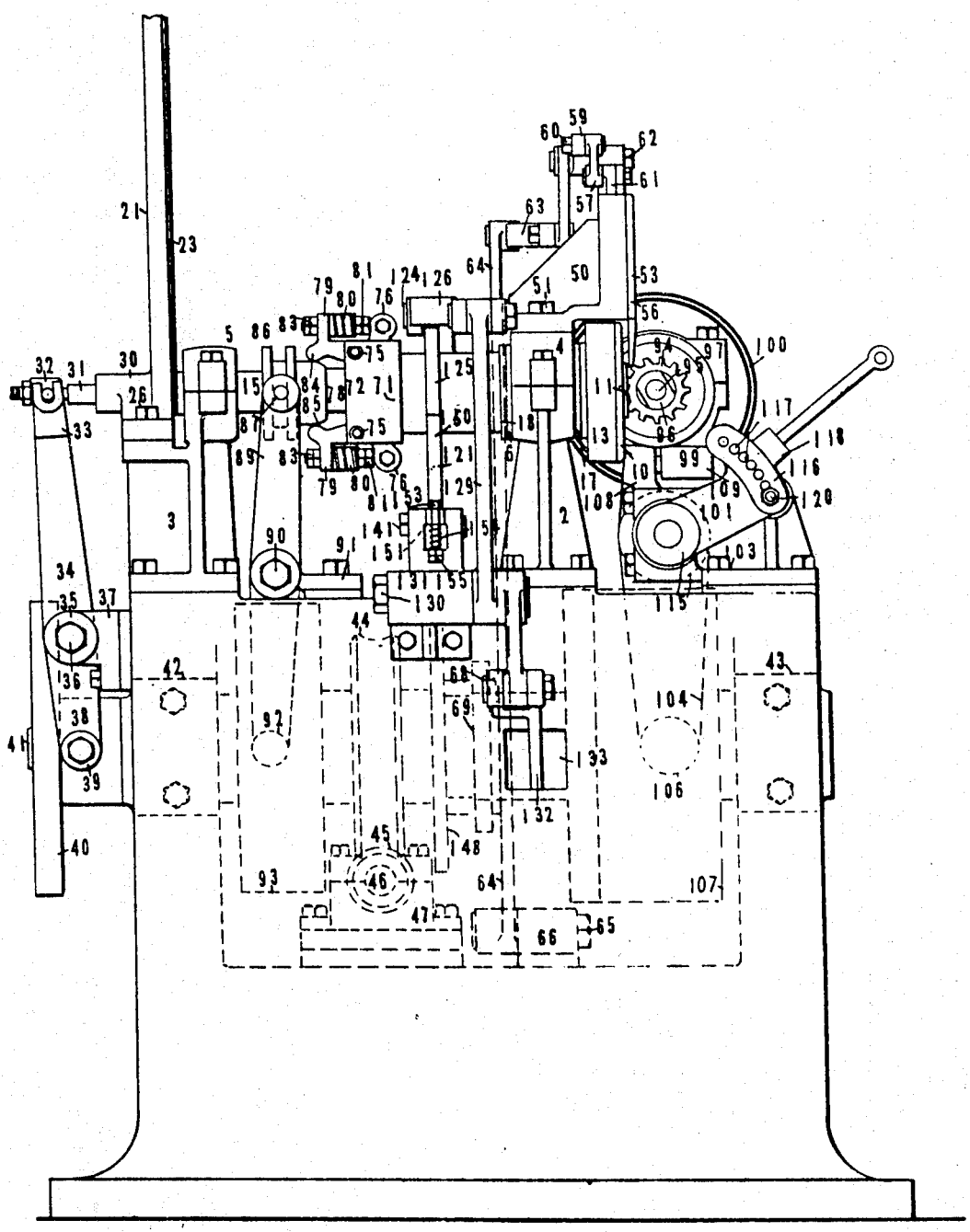

E. C. BOERNER.
AUTOMATIC NUT CASTELLATING MACHINE.
APPLICATION FILED MAR. 21, 1910.

998,229.

Patented July 18, 1911.
9 SHEETS—SHEET 2.

E. C. BOERNER.
AUTOMATIC NUT CASTELLATING MACHINE.
APPLICATION FILED MAR. 21, 1910.

998,229.

Patented July 18, 1911.
8 SHEETS—SHEET 3.

WITNESSES:

INVENTOR
E. C. Boerner
BY
ATTORNEYS

E. C. BOERNER.
AUTOMATIC NUT CASTELLATING MACHINE.
APPLICATION FILED MAR. 21, 1910.

998,229.

Patented July 18, 1911.
8 SHEETS—SHEET 6.

WITNESSES:

INVENTOR
E. C. Boerner
BY
ATTORNEYS

E. C. BOERNER.
AUTOMATIC NUT CASTELLATING MACHINE.
APPLICATION FILED MAR. 21, 1910.

998,229.

Patented July 18, 1911.
8 SHEETS—SHEET 8.

UNITED STATES PATENT OFFICE.

EMILE C. BOERNER, OF PORT CHESTER, NEW YORK, ASSIGNOR TO RUSSELL, BURDSALL & WARD BOLT AND NUT CO., OF PORT CHESTER, NEW YORK, A CORPORATION OF NEW YORK.

AUTOMATIC NUT-CASTELLATING MACHINE.

998,229.

Specification of Letters Patent. Patented July 18, 1911.

Application filed March 21, 1910. Serial No. 550,617.

*To all whom it may concern:*

Be it known that I, EMILE C. BOERNER, a citizen of the United States, residing at Port Chester, in the county of Westchester and State of New York, have invented certain new and useful Improvements in Automatic Nut-Castellating Machines, of which the following is a full, clear, and exact description, such as will enable others skilled in the art to which it appertains to make and use the same.

This invention broadly deals with machines for cutting one or more slots in suitable portions of blanks for nuts, or the like, as in producing what is technically known as a "castellated" nut; but inasmuch as certain noteworthy advantages characteristic of this invention prominently appear in its more intense aspect as an essentially automatic machine for continuously receiving a supply of nut-blanks and for subsequently delivering the same in the form of castellated nut-blanks without requiring special manipulation on the part of the attendant, it will be conducive to clearness to disclose this invention by way of a specific description of such an embodiment thereof.

One object within the contemplation of this invention is to render commercially available an automatic machine capable of rapidly and with a high degree of perfection producing a plurality of equispaced radial slots in the top or crowned portion of nut-blanks.

Another object is to provide a machine of the foregoing character which is simple, durable, highly efficient, and capable of being constructed at a reasonable cost and requiring minimum effort and skill on the part of the attendant.

Another object is to produce a machine having a rotating hollow spindle through which a train of hexagonal nut-blanks may be fed and in turn successively clamped with the crowned portion exposed and in position to be contacted with by a rotating milling cutter adapted to cut the several radial grooves in the end of such nut serving to convert the same into castellated nuts.

Figure 2:
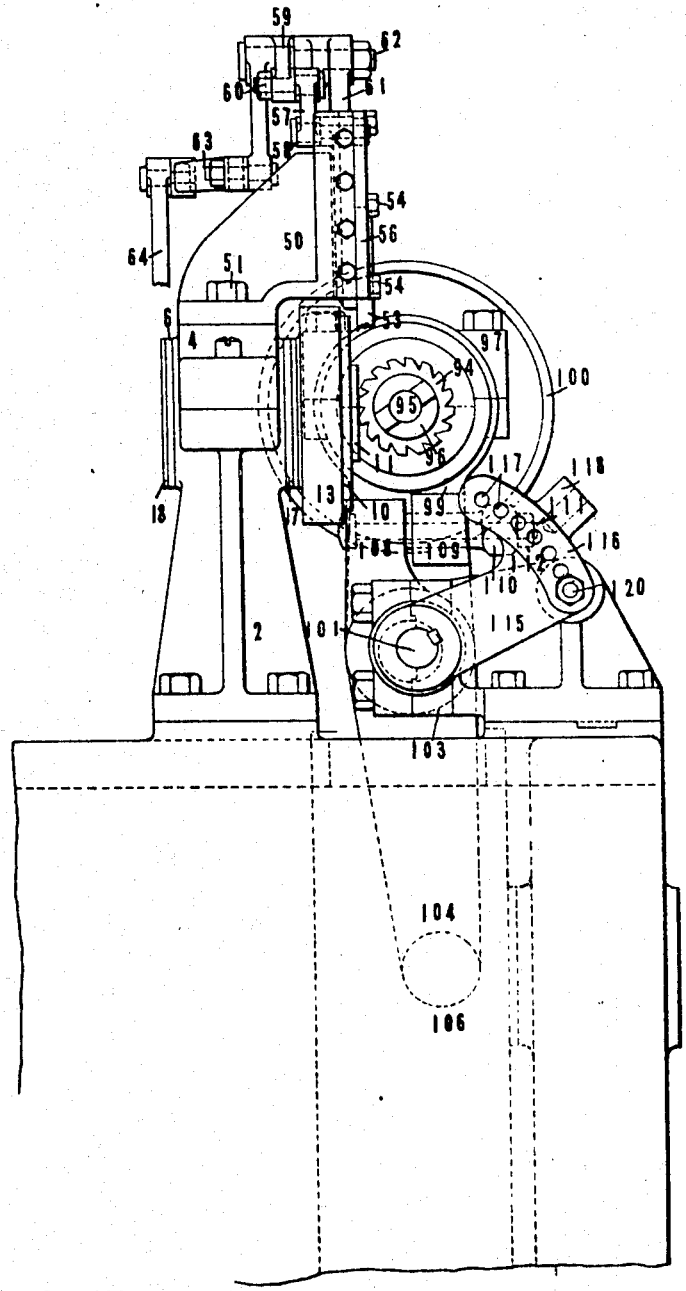
Figure 3:
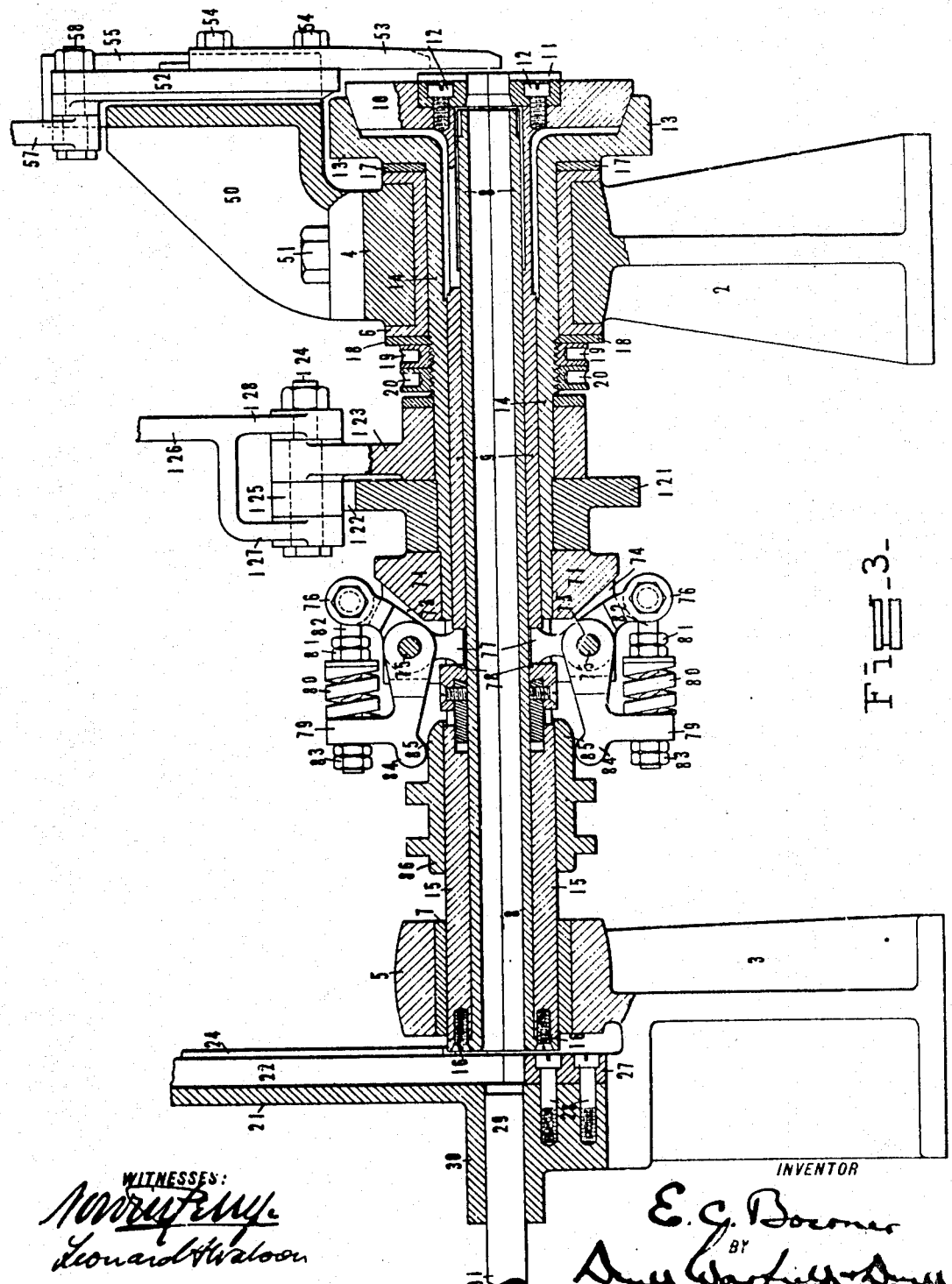
Figure 4:
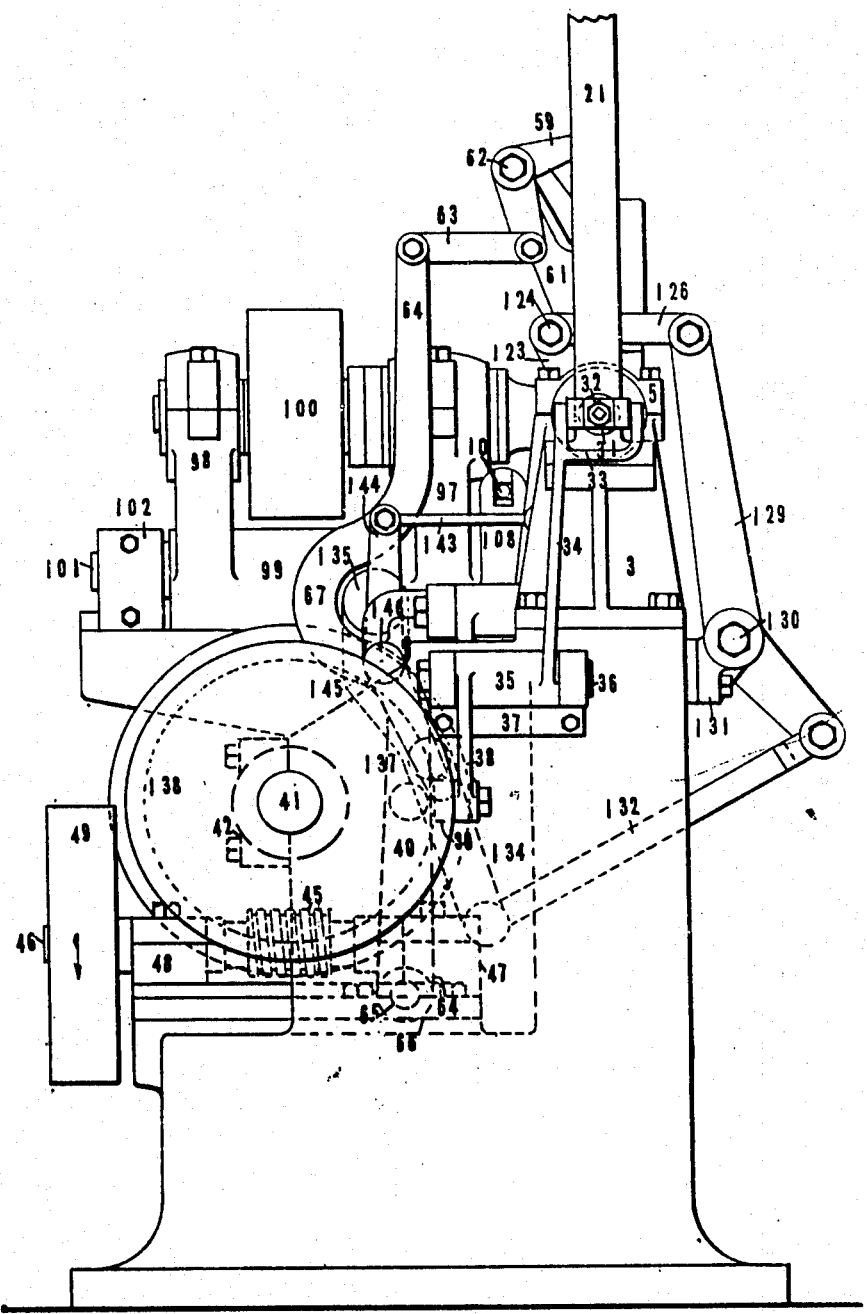
Figure 5:
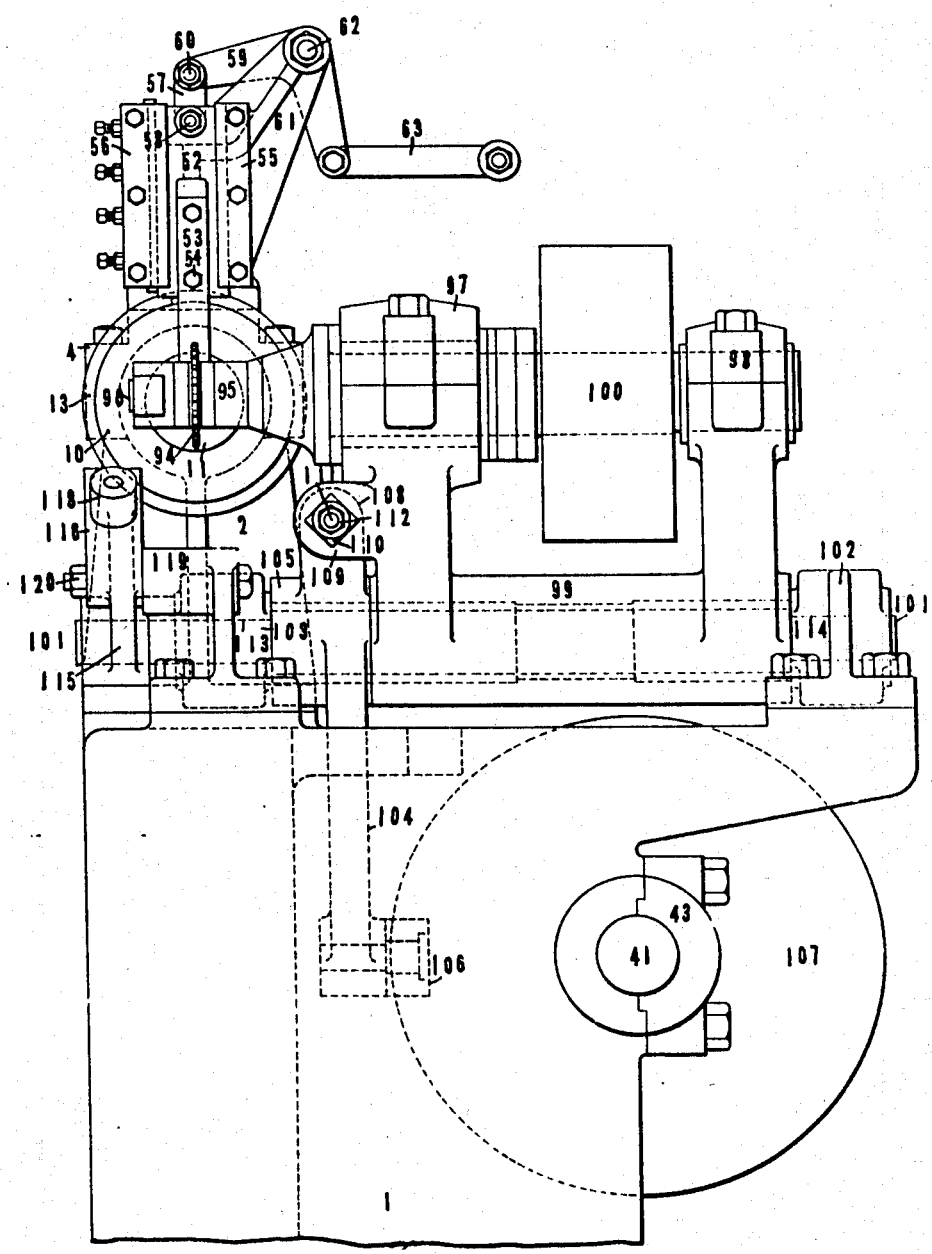
Figure 6:
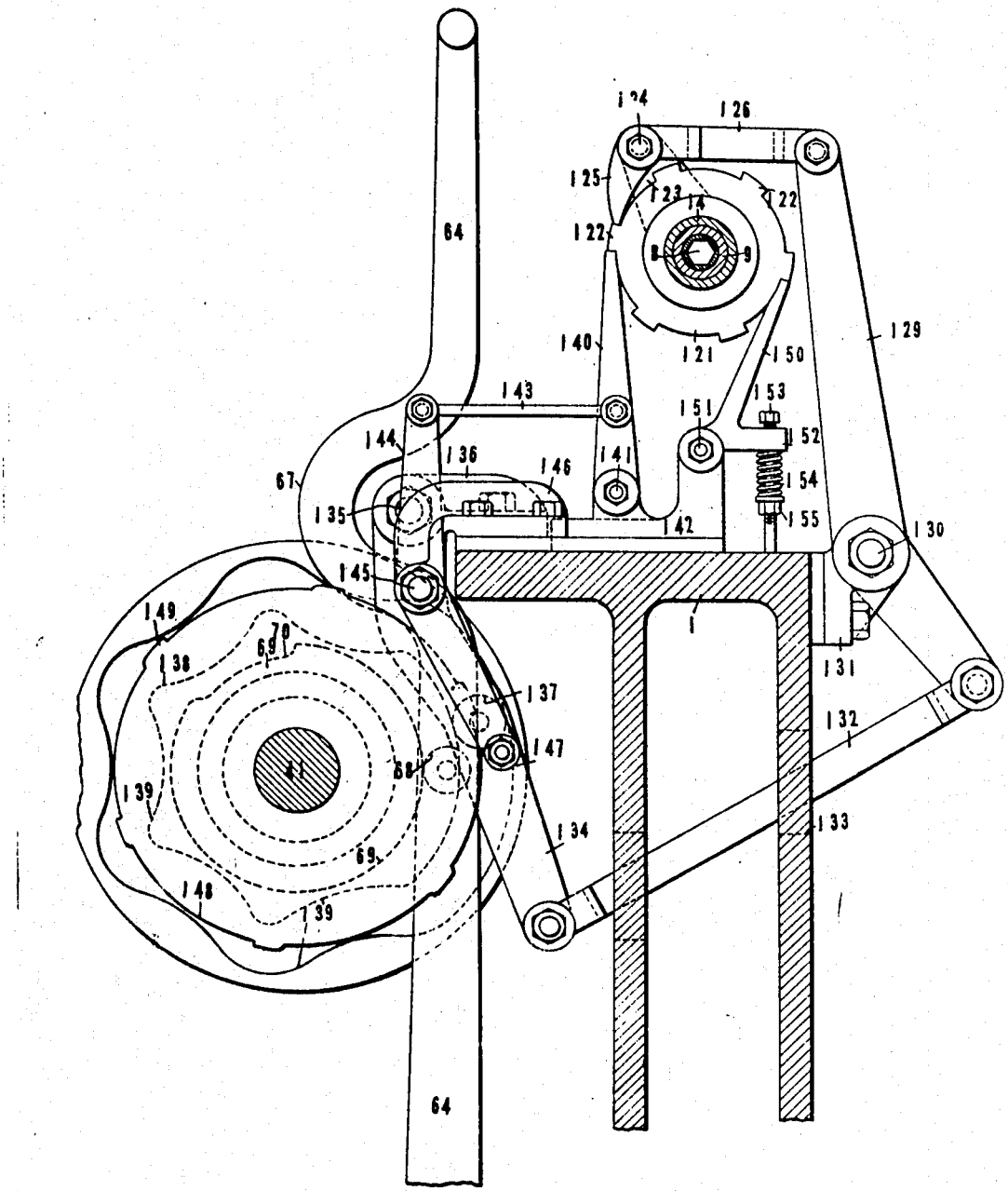
Figure 7:
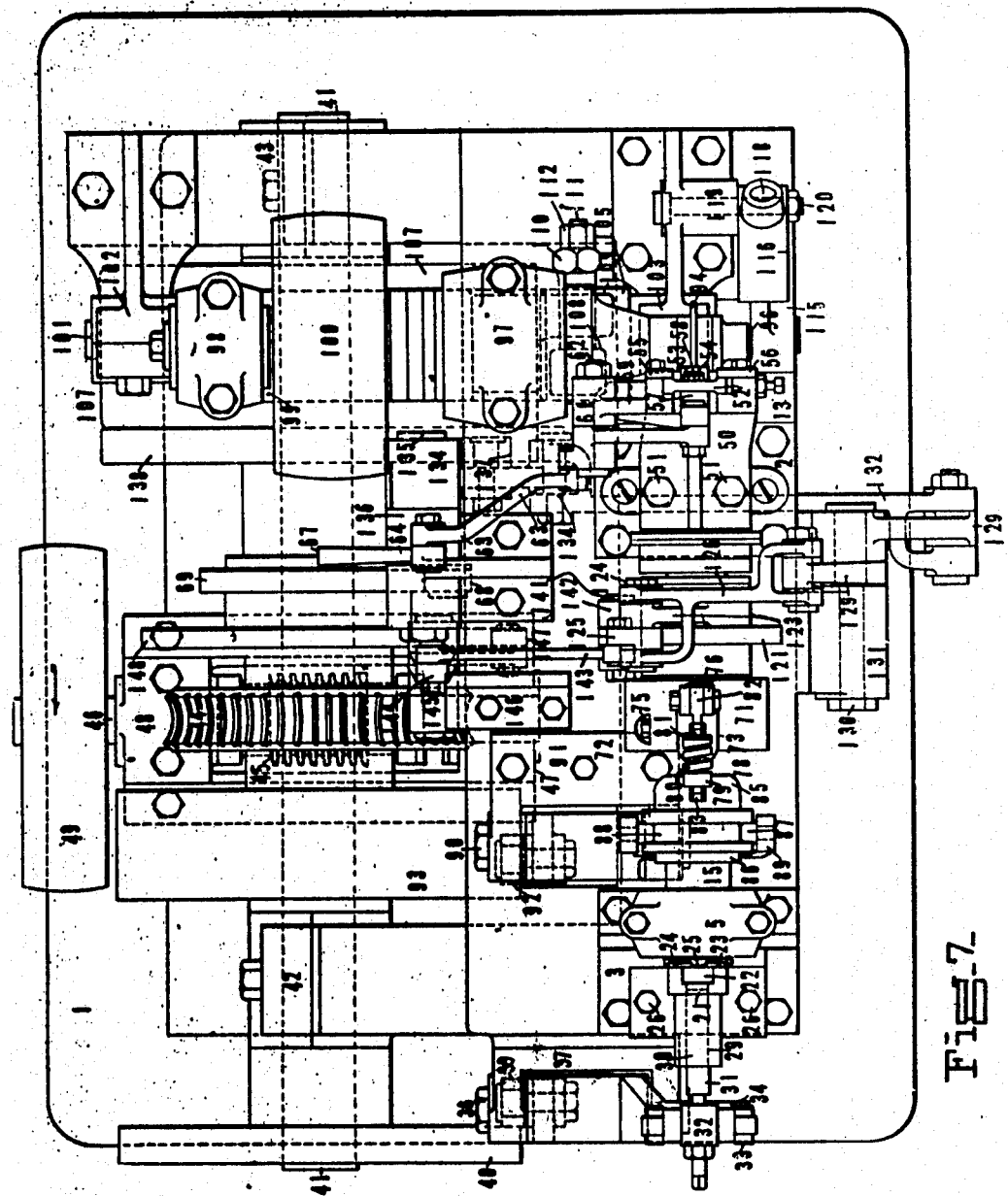
Figure 8:
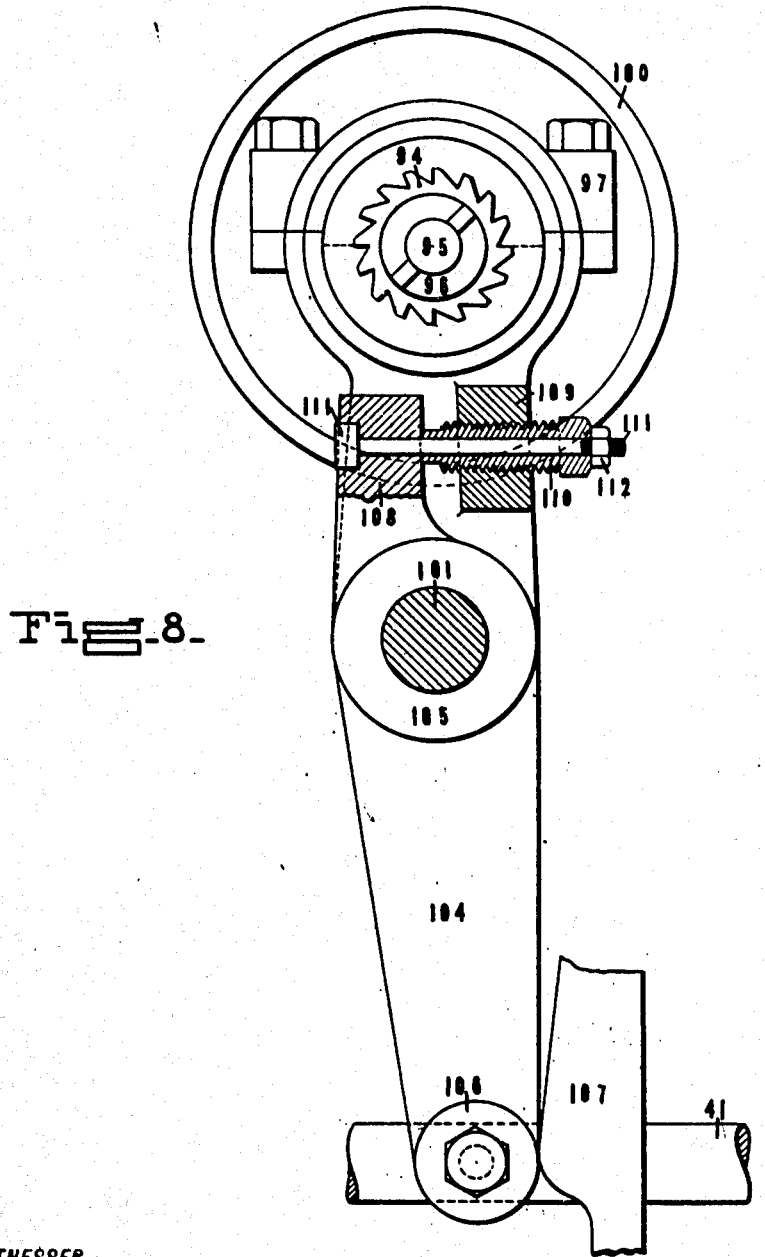

Other objects will be in part set forth in the following description and in part obvious from the accompanying drawings exemplifying one of the many possible embodiments of this invention, and in such drawings, like characters of reference denote corresponding parts throughout all the views of which;

Figure 1 is a general view inside elevation, showing the external appearance and arrangement of parts as assembled in the machine with the collet-clutch for the nut-blanks appearing in longitudinal elevation. Fig. 2 is an enlarged detail view, showing in side elevation the circular slotting-cutter in position to operate on the nut-blanks. This view is substantially the same as the corresponding portion of Fig. 1, except in so far as certain details not appearing on Fig. 1 are shown. Fig. 3 is a vertical section taken through the longitudinal axis of the collet-chuck which appears in longitudinal elevation in the foregoing two views. Fig. 4 is rear elevation of the assembly shown by Fig. 1, looking toward the rear end or side of the machine into which the nuts are fed, *i. e.*, opposite the front end or side at which the slotting is carried out. Fig. 5 is an enlarged front elevation looking in a direction opposite from that shown in Fig. 4 and illustrating, in enlarged detail, the parts more immediately associated with the slotting mechanism. Fig. 6 is a vertical section taken transverse to the longitudinal axis of the collet-chuck and showing certain parts in side elevation, which comprise the mechanism for intermittently turning the collet chuck through predetermined angles to locate the spacing of the radial slots in the castellated nut-blank. Fig. 7 is a plan view in general assembly of the various elements and sub-combinations which constitute this embodiment of this invention. Fig. 8 is a side elevation showing in detail the means for determining the limits of movement of the revolving cutter so that the same may be regulated as desired.

Continuing now by way of a more detailed description of the herein disclosed machine, turning occasionally to the drawings, as indicated by the reference characters, it may be preliminarily stated that in its more intense aspect the general combination forming this machine preferably comprises: (1) A rotating hollow spindle terminating in a suitable chuck; (2) means for forcing a train of hexagonal nut-blanks through such hollow spindle, (3) a vibratory stop to precisely determine the extent to which each nut blank protrudes from the face of the chuck, (4) means for operating the chuck to clamp the nut blank securely in such position during the slotting operations, (5) a suitable slotting cutter preferably in the form of a rotating milling cutter, (6) means for periodically advancing said rotating-cutter against the protruding portion of the nut blank to slot the same, (7) means for intermittently rotating the spindle through suitable angles, as for example 60° or 180°, in the making of a hexagonal castellated nut, and (8), means for discharging the nut when sufficiently formed. While each the above enumerated major sub-combinations is preferably to be so embodied as to perform its above specified function alone at an appropriate instant in the cycle of operation of the whole machine or perhaps in certain cases perform dual functions, it is nevertheless to be understood that all of the appended claims are not limited to specifically include all of these elements, inasmuch as it is apprehended that one or more thereof may be eliminated and their function performed by either by other or equivalent mechanisms, or even to a certain extent by more or less simple hand operations on the part of the attendant.

*The automatic chuck for correctly positioning the nut blanks during the slotting operation.*—In the preferred embodiment of this invention, this mechanism assumes the form of a split or collet-chuck combined with suitable devices for closing the same at appropriate intervals to rigidly and accurately position the nut-blanks during the operation of slotting or castellating the same. By turning to Fig. 3 there will be seen in detail one of the many possible embodiments which this invention may assume in this particular, and which construction has been found in practice to be durable, serviceable and in general eminently satisfactory. In this preferred construction, the chucking apparatus is revolubly supported on the base-portion or body-casting 1 of the machine by means of two supports or uprights 2 and 3. These supports terminate at their upper ends in apertured hub-like portions 4 and 5, preferably provided with suitable bushings 6 and 7 forming bearings or journal-boxes for the journals of the revolubly mounted collet-chuck. This collet-chuck is of a compound character and is composed of an inner elongated tubular member 8, which is shown in longitudinal section by Fig. 3, and in transverse section by Fig. 6, and which has a bore having the contour of a hexagon, which is a slightly enlarged counterpart of the hexagonal nut-blanks which the machine is to slot or castellate. One of the primary functions of this central elongated hexagonally apertured member 8 is to form a feeding track for supplying the jaws of the collet-chuck with nut-blanks. Telescoping the forward portion of this central member 8 is a tubular shank 9, which is radially split at its forward extremity and flares out to form the contracting or jaw portion 10 of the collet-chuck. This member may be termed the collet-chuck. Preferably, a number of hardened jaw-blocks 11 will be secured to the contracting portions 10 of the collet-chuck, as by means of screws 12, and thus compensate for wear and enable the clamping or contact surfaces to be replaced in case they may have become unduly chipped or otherwise roughened. This chuck member is, like that of the corresponding part of an ordinary collet-chuck, capable of being advanced and retreated with respect to a chuck-closer for the purpose of clamping and releasing the nut-blanks. The mechanism for automatically doing this will be described presently.

The chuck-closer consists of an elongated tubular member which telescopes the above-mentioned parts and terminates at its forward end in the chuck-closer 13, which provides an enlarged conical or tapering recess in its forward end adapted to receive the counterpart jaw portions 10, so that as such jaw portions are forced into this conical recess such jaw-portions 10 will be contracted to clamp the base-portions of the nut-blanks, as will be well understood by those familiar with collet-chucks. The shank portion 14 of the chuck-closer telescopes or overrides the shank portion 9 of the collet-chuck and is exteriorly journaled in the bushing 6 supported by the hub 4 of the standard 2. At its rear extremity, the chuck-closer has a portion 15 which telescopes directly on the hexagonally apertured member 8 and is positively secured in position thereon by means of the end-screws 16. Exteriorly, this portion 15 is journaled into the bushing 7 mounted in the hub 5 of the standard 3. From this it will be perceived that the three main elements above described, i. e., the external chuck-closer, the intermediate collet-chuck and the central blank-feeding tube, may all rotate as a unit in the standards 2 and 3. To prevent axial or longitudinal displacement of the first and last-mentioned parts, a bushing 17 may be interposed between one end of the bushing 6 and an adjacent part of the chuck-closer, and on the other side a bushing 18 may be interposed between the corresponding end of the bushing 6 and a spanner nut 19, screw-threaded to the chuck-closer shank portion 14 and locked in place by the companion lock-nut 20, as will be readily understood.

It now remains to next consider the means for feeding the nut-blanks into the collet-chuck.

*The automatic nut blank feeder.*—Turning now to Figs. 1, 3, 4 and 7, a hopper such as the vertical chute 21 provides a channel 22 adapted to contain the series of superimposed nut blanks which are to be successively fed into the machine. Preferably the forward side of this channel 22 is partly closed by means of plates 23 and 24, the adjacent edges of which are separated to provide the vertically elongated sight or space 25 through which the operator may visually determine the condition of the supply of nut-blanks. The lower part of this chute is secured to the standard 3 by means of bolts 26, and preferably a wear-resisting bushing 27 removably secured to the chute by means of screws 28 constitutes a bottom-stop in registry with the adjacent part of the hexagonally apertured member 8, so that the lowermost nut blank may be radially pushed into this hexagonal aperture without interference.

This invention furthermore proposes an automatic means for continuously and at proper intervals forcing the lowermost nut-blank into the hexagonal bore of the central elongated feed-member 8, and to that end provides an intermittently acting plunger 29 which is slidably mounted in a correspondingly apertured hublike portion 30 of the chute. This plunger is in coaxial registry with the hexagonal bore of the feed-member 8, so that during its advance the lowermost nut-blank which is opposite its forward end will be forced into the hexagonal aperture of the member 8 and thus fill such member with a train of nut blanks. The blanks will be so placed in the hopper or chute 21 that their crowned portions will face forwardly and their base-portions rearwardly. The foremost blank of this train will be forced partly through the aperture in the end of the collet-chuck, and will have the extent to which its crowned end or portion will protrude determined by a suitable stop, and its base-portion will then be firmly clamped in place by the contractile operation of the collet-chuck preparatory to the beginning castellating operation.

Turning to Figs. 1 and 7, it will be seen that the rear end 31 of the plunger 29 protrudes from the hub portion 30 and adjustably carries a pivot block 32 of some suitable construction. This pivot block is pivotally connected with the bifurcated end 33 of the lever 34. At a lower point this lever 34 is provided with a hub 35 which, by means of a suitable pivot pin 36, is pivotally supported by the bearing block 37 which is in turn bolted to the main-frame or body-casting 1 of the machine. This lever 34 also carries an extension or arm 38 which, at its extremity carries the cam roller 39, whereby the cam 40 may oscillate the same at appropriate intervals and thus produce a corresponding reciprocation of the plunger 31 with a resultant intermittent feed of the nut blanks at appropriate intervals. This cam 40 is secured to one end of a shaft 41 which is longitudinally mounted on the body casting by means of journal boxes 42 and 43. Mounted on an intermediate part of this shaft is a gear 44 in mesh with a worm 45 which is mounted on the lower transverse shaft 46. This shaft 46 is secured to the body-casting by means of journal boxes 47 and 48, and its protruding end carries the main driving pulley 49. From this it will be perceived that when the main drive pulley 49 is rotated in the direction indicated by the arrow placed thereon, the worm on the shaft 46 will rotate the worm-gear 44 on the transverse shaft 41 and thus rotate the cam 40 and oscillate the lever 34 and thereby periodically reciprocate the plunger 31. In this way, the hexagonal nut-blanks will be intermittently fed through the hexagonal bore of the member 8 and brought successively into a position to be clamped by the collet-chuck in the proper position preparatory to the slotting operation. It will perhaps be noticed at this point that while this means will operate very nicely to forwardly feed the nut blanks, it will preferably be supplemented by some contrivance capable of very accurately determining the forward position of the foremost nut-blank in the train of blanks passing through the hexagonally apertured spindle. In other words, since the slotting cutter will have a positively determined advance it will be necessary to accurately and positively determine extent of the forward protuberance of the nut-blank in the collet-chuck. This invention therefore contemplates a reciprocating stop which is adapted to come to position in advance of the train of nut-blanks to act as a limit gage for determining the foremost position of the forward blank, and then withdraw after the nut-blank has been suitably clamped by the collet-chuck. This mechanism may now be described.

*The movable stop for automatically positioning the nut-blanks in the collet-chuck.*—Turning now to Fig. 3, a casting or bracket 50 is secured to the standard 2 by means of bolts 51. This bracket furnishes a sliding bearing for the vertically reciprocating slide-block 52 to which the stop 53 is secured by means of bolts 54. This bearing may consist of a vertically elongated front recess for receiving the block 52, and guide plates 55 and 56 for holding this block 50 in place against displacement. Block 50 receives its movement from a connection arranged at its upper end, as shown more clearly by Fig. 5. This connection comprises a floating link 57 which at one end is secured to the upper end of the block 52, as by means of the pivot bolt 58, and at its other end is pivotally secured to one arm of the bell crank lever 59, as by means of a pivot bolt 60. This bell crank lever is in turn pivoted to an extension 61 of the bracket 50 by means of a pivot bolt 62 so that as the bell crank lever 59 reciprocates it will raise and lower the link 57 and impart a corresponding movement to the block 52 which carries the movable stop 53. The mechanism for oscillating the bell crank lever 59 consists of an offset link 63 pivoted at one end to the bell crank lever 59 and at its other end to the upper extremity of the long vertical lever 64. This lever 64 is pivoted at its lowermost extremity to a pivot pin 65 which is carried by the pillow block 66 on the main-frame or body-casing 1 of the machine. At the intermediate portion indicated by 67, this lever is crooked so as to pass by the support for a member which forms a part of the chuck turning mechanism. This lever 64 carries a cam roller 68 (see Figs. 6 and 7) at a point intermediate its length and below the crook 67, and this cam roller rides on the periphery of the cam 69 which is mounted on the shaft 41. As a consequence of this arrangement, when the cam 69 has revolved under the roller until the cut-away portion 70 is reached, the roller 68 will drop down such portion and cause the lever to swing to the left on Figs. 4 and 6, with the result that the block carrying the stop 53 will be depressed, thereby moving the stop 53 into the path of the now released nut which is protruding from the end of the collet-chuck, thus knocking this nut downwardly and at the same time forming a stop against which the crowned end of the succeeding nut may be pushed so as to accurately position the same. The last mentioned nut-blank is now in a position ready to have its base-portion firmly clamped and held in place by the chuck so that the slotter may be brought against the exposed crowned end of the nut and cut the several radial slots therein which will form the nut into a castellated nut. This chuck-closing mechanism will now be described.

*The mechanism for automatically closing the chuck to clamp the nut-blank.*—It may be preliminarily stated that this mechanism is operated by pulling the sleeve 9 toward the left as shown by Fig. 3, thereby drawing the jaws 10 of the collet-chuck into the chuck-closer 13 and thus contracting the same on the base portion of the nut. The mechanism for doing this comprises a supporting collar 71 which is secured to the sleeve 14 of the chuck-closer and which has an overhanging annular rim 72 having two diametrically opposite radial slots 73 and 74. Mounted in each slot by means of a suitable pivot pin 75 is the short chuck-actuating lever 76. The foot 77 of this lever is received by a suitable recess provided by the sleeve 9 and a hardened bushing 78 is preferably provided for the purpose of resisting wear when the foot is moved to the left to close the chuck. In this connection it may be stated that occasionally the nut blanks will vary somewhat in size and to prevent injury to the chuck due to an occasional over-size in a nut-blank, the chuck-closer provides a resilient compensating device. This consists in employing a supplemental actuating lever 79 which is pivoted to the pivot pin 75 and which actuates the short lever 76 through the instrumentality of a suitable spring 80 which at one end bears against the lever 79 and at the other end bears against a nut 81 mounted on the shaft 82, which is pivoted at one end to the lever 76 and at the other end passes through the lever 79 and terminates in a nut 83, which operates to prevent the spring 80 from separating the levers 79 and 76 unduly. The lever 79 also provides a bearing boss 84 which is actuated by means of the conical end 85 of a sliding sleeve 86 which is positioned by means of the rollers 87 and 88 carried by the bifurcated upper end of the chuck-closer lever 89. From this it will be perceived that as the lever 89 oscillates, the lever 79 will be actuated and through the spring 80 will in turn operate the lever 76 to open and close the chuck. The lever 89 is pivoted at 90 to the pillow block 91 which is bolted to the main frame or body casting of the machine. The lower end of the lever 89 carries a cam roller 92 and receives its motion from a cam 93 mounted on the shaft 41.

The nut-blank, by the operation of the above mentioned parts, will thus have been fed through the spindle of the chuck, forced against the reciprocating stop 53 to determine the extent to which it will protrude; and finally clamped securely in position. It is now ready for the first slotting operation, which may be performed by means of the mechanism which will be next described.

*The advancing and retreating rotating slotting cutter.*—This mechanism embraces a spindle rotatably mounted on a frame adapted to be moved toward and away from the crowned portion of the nut-blank so as to bring the milling cutter or slotter into operative engagement with the end of such blank to cut radial slots therein and thereby carry out the process of castellating. This mechanism is so constructed that the extent of the advance of the slotting cutter can be accurately determined and controlled so as to accurately gage the depth of the slots cut in the blank. The details of this sub-combination are shown in enlarged end elevation by Fig. 2, in front elevation by Fig. 3, and in plan view by Fig. 7. The slotting cutter 94 provides a narrow cutting edge counterpart in contour to that of the slots which it is desired to form in the castellated nut. This cutter may be an ordinary milling cutter and is mounted on the spindle 95 by means of a suitable nut 96. This spindle 95 is in turn journaled in suitable boxes 97 and 98 which are at the upper extremities of corresponding standards uprising from the rocking frame or casting 99. Intermediate these two boxes, a pulley 100 is mounted on the spindle 95 thereby enabling such spindle to be driven by means of a suitable belt at such speed as is appropriate for the operation of the milling cutter.

The means for advancing the slotting cutter into the work consists, broadly speaking, in pivotally mounting the lower part of the casting 99 and providing a lever which extends downwardly therefrom into engagement with a cam, so that by oscillating this lever or arm the casting 99 will be oscillated to swing the spindle 95 toward and away from the work. In carrying out this construction, the base of the casting 99 is provided with an elongated horizontal bore through which passes the intermediate part of a shaft 101. This shaft 101 is in turn supported by bearing boxes 102 and 103, and while such shaft may turn in these bearing boxes for purposes of vertical adjustment, as will be hereinafter explained, such shaft 101 is normally stationary or non-revoluble. That is to say, the casting 99 oscillates for a limited angular distance about the shaft 101 as though the latter were a fixed pivot pin. For the purpose of producing this oscillation of the casting 99, a lever 104 has its upper hub 105 rotatably journaled on the shaft 101, and the lower end of this lever carries a cam roller 106 which is actuated by means of the circular cam 107, as will be readily understood. The connection between the lever 104 and the oscillating spindle support 99 is made adjustable so that the extent of the advance of the slotting cutter can be accurately controlled and adjusted. To this end, the lever 104 extends upwardly at its upper end in the form of a lug 108. This lug is located opposite a counterpart lug 109, which extends from the casting 99. The lug 109 has a large-diameter aperture which is internally screw-threaded to receive the shank of the tubular bolt 110, so that the tip of such bolt may be caused to project from this threaded aperture against an adjacent part of the lug 108 to distance the same from the companion lug 109. The lug 108 also has an aperture in coaxial relation with that of the enlarged aperture in the lug 109, and through this aperture passes the shank of a bolt 111, which shank also passes through the bore of the hollow bolt 110 and protrudes through its head, as shown more clearly by Fig. 2. A lock nut 112 is threaded on the forward extremity of the bolt 111 and serves to draw the same tight to hold the lug 108 firmly against the protruding end of the hollow bolt 110, which is carried by the lug 109. From the foregoing it will be clearly perceived that, by this adjusting mechanism, the relative position between the slotting cutter and the nut blank to be castellated can be readily and accurately determined.

While it would be possible to cut a diametrically complete slot in the crowned end of a nut blank in one operation, this would require the use of a milling cutter of an undue diameter in order to avoid obtaining an undesirable curvature in the bottom of the slot, and therefore it is preferred to use a moderate sized milling cutter, as shown on the drawings, and to cause this milling cutter to cut radial slots only; i. e., semi-diametrical slots, and to repeat this operation six times for a hexagonal nut, so as to fully complete the castellation of the blank. This involves the setting of the center of the cutting spindle somewhat above the longitudinal axis of the collet chuck holding the nut blanks. This distance will require adjustment, according to the size of the nut blank undergoing formation, and to that end this invention proposes to form the shaft 101 in such manner that its ends will extend in the form of offset or eccentric supporting parts 113 and 114. These eccentric portions are journaled in the boxes 102 and 103 and, as will be perceived, a rotation of the shaft 101 will cause its intermediate part on which the casting 99 is journaled to rise or fall after the fashion of an eccentric, and thus enable the elevation of the slotting cutter 94 to be accurately determined. To enable this rotation of the shaft 101 to be readily accomplished, an arm 115 is keyed to the extremity of the shaft end 113, and this arm provides a sector 116 having a plurality of apertures 117. The sector 116 may also provide a lug 118 adapted to receive the end of a handle for enabling the arm 115 to be revolved. The bearing block 103 extends adjacent this sector 116 in the form of a hub 119 which has an aperture capable of being brought into coaxial registry with any one of the apertures 117 to enable the bolt 120 to be passed through the alined apertures and thus hold the arm 115 securely in the predetermined adjusted position. It will furthermore be noticed, upon turning to Figs. 1, 2 and 5, that the cutter is radially offset in such a direction with respect to the center of the nut-blank that the working teeth of the cutter travel toward the center of the blank and terminate thereabout. This novel arrangement possesses the very considerable commercial advantage that the "bur" is thrown entirely into the center of the blank and accordingly may be very easily removed by some usual subsequent operation such as drilling or threading or the like.

From the foregoing it will be readily perceived that this slotting mechanism is not only capable of operating easily and efficiently, but may be adjusted both as to the vertical position of the slotter and as to the limit of advance of the same. This arrangement is adapted for cutting a single slot the length of a radius in the crowned end of a nut blank, and therefore means is provided whereby the chuck may be turned a sixth of a revolution preparatory to each advance of the slotting cutter so as to cut the six slots required by the operation of castellation. This roulette mechanism for turning the nut blank will now be described.

*The automatic step-by-step rotator for the chuck.*—The purpose of this device is to intermittently rotate the chuck in which the nut is positioned so as to present different radial portions of the nut-blank successively to the action of the slotting cutter during each advance of the same. In castellating hexagonal blanks, it will obviously require six advances of the slotting cutter and six angular rotations of 60° each of the nut-blank to form slots for enabling a cotter-pin to pass through each of the six sides or faces of the hexagonal nut-blank. In other words, this mechanism provides means for rotating the collet-chuck accurately through an angle of 60° during each retreat of the slotting cutter. The mechanism for accomplishing this function is shown in detail by Fig. 6 and in a more general way by Figs. 1, 3, 4 and 7. Fixed to the spindle 14 of the chuck closer 13 is a roulette wheel 121, the periphery of which provides six equispaced stops 122 which are contrived to precisely determine the six different positions of a nut-blank. Coöperating with this roulette wheel 121 is a mechanism for intermittently turning the same through 60° and also devices for positively retaining the same against movement during the operation of the slotting cutter. The mechanism for intermittently rotating this roulette wheel through 60° consists of a rocker 123 which is revolubly journaled on the sleeve 14 of the chuck-closer 10 so as to be capable of being oscillated on the same. A pivot-pin 124 passes through an aperture in the other extremity of this rocking support and this pivot-pin also loosely carries a pawl 125 which is adapted to drop back into the circumferential recesses in the roulette wheel and successively engage the projections on the same so as to turn such roulette wheel during the oscillations of the rocker 123. To enable such rocker to be oscillated in a proper manner, this invention also contemplates a link 126 having its forward end bifurcated to provide the parts 127 and 128 for holding and receiving the pivot-pin 124. The other end of this link 126 also terminates in an offset bifurcated end as shown more clearly by Fig. 7 and at such point it is pivoted to the upper end of the actuating bell crank lever 129. This bell crank lever is pivotally supported at an intermediate point by means of the pivot-bolt 130 which is carried by block 131, bolted in turn to the main frame or body casting 1 of the machine. A link 132 passes through an aperture 133 in the side wall of the body casting 1 and at its other end is pivoted to the actuating lever 134 which is pivotally supported at its upper end by means of the pivot-pin 135 carried by the supporting block 136. A cam roller 137 is mounted at an intermediate point on this lever, as shown more clearly by Fig. 6, and coöperates with the cam 138 secured to the shaft 41, and having a cam-groove in a side face thereof. The mode of operation of this sub-combination is as follows: When the shaft 41 revolves, the groove of the cam 138 actuates the roller 137 and, at appropriate intervals by the projections 139 in the groove of such cam, this will rock the actuating lever 134 and through the instrumentality of the connections formed by the link 132, the bell crank lever 129 and the second link 126, the rocker 123 pivoted on the spindle of the chuck will be oscillated, thus bringing the pawl intermittently into action with the roulette wheel, thereby turning the parts as described. For the purpose of securing all necessary precision in the angular position of the nut-blank, this invention also provides a stop for limiting the forward angular movement of the roulette wheel, and also a stop for limiting any return movement thereof. The means for limiting the forward movement of the roulette comprises an elongated pawl 140 which is pivotally supported at its lower end by means of a pivot-pin 141 carried by the block 142 which is in turn secured to the main body casting 1 of the machine. To enable the roulette to be turned at intervals, this invention also provides a releasing mechanism for this pawl, and this releasing mechanism comprises a link 143 pivoted at one end to the pawl 140 and at the other end to the upper extremity of a bell crank lever 144 which is pivotally supported at an intermediate point by means of the pivot-pin 145 secured to the block 146 and which at its lower end carries the cam roller 147 which rides around the periphery of the cam 148. This cam is provided with six equispaced projections 149 which at appropriate intervals ride under the roller 147 and by lifting the latter momentarily withdraws the pawl 140 from its engagement with the catch 122 on the roulette wheel, thereby releasing and enabling the latter to be rotated. The means for preventing a backward movement of this roulette wheel is extremely simple and merely comprises the pawl 150, the lower end of which is pivotally supported by means of the pivot-pin 151 carried on the block 142. This pawl has an offset portion 152 which is apertured. Through this aperture passes the shank of a bolt 153 which carries a spring 154 bearing against the underside of the projection 152 and thus operates to urge the other end of the pawl against the periphery of the roulette wheel. A nut 155 may be provided for the purpose of adjusting the tension of the spring 154. It will be readily understood that during the rotations of the roulette wheel, this pawl will successively ride over the several circumferential projections thereon and snap back into place behind each in turn and thus prevent a backward movement of the chuck.

As a matter of convenience in this description, the nut-blank has been discussed as consisting of two main portions, i. e., a base-portion and a crowned portion. By the base-portion is meant the part which in normal use will more directly receive the pressure when the nut is screwed home, and by the crowned portion is meant the other end or top of the nut, which is usually provided with a slight dome or so-called "crown." It is to be understood, however, that this invention is equally applicable to nuts that are crowned as well as to those which are not, but the term "crowned" has been used as a matter of clearness as denoting one end of the nut.

Without further elaboration, and in the light of current knowledge, the foregoing disclosure will sufficiently suggest and otherwise enable those skilled in this art to readily utilize various interchangeably available and mechanically equivalent structures which, although perhaps calculated to appear more or less different in one or more respects under a casual inspection, and perhaps embodying arrangements of parts somewhat dissimilar from that herein shown, would nevertheless appropriate certain, if not all of those features, which from the aspect of the prior art constitute essential and advantageous characteristics of this invention, and therefore such structures or sub-combinations should, and accordingly are intended to be comprehended within the wording and legitimate scope of the following claims.

Having described my invention, what I claim as new and desire to secure by Letters Patent is:

1. A device of the nature disclosed comprising, in combination, a device adapted to clamp a nut-blank whereby the crowned portion thereof may be exposed, a hopper adapted to contain blanks, automatic mechanism for successively transferring blanks from said hopper to said device, a cutter-support mounted opposite the exposed portion of said nut-blank, a cutter revolubly mounted on said cutter-support and adapted to cut narrow slots in the end of said nut-blank while thus clamped, means for periodically producing a contact between said blank and said cutter, and means for producing a relative angular shift between the said blank and said cutter at periodic intervals.

2. A device of the nature disclosed comprising, in combination, a device adapted to clamp a nut-blank whereby the crowned portion thereof may be exposed, a hopper adapted to contain blanks, an instrumentality for successively transferring blanks from said hopper to said device, a stop against which said blanks are urged by said instrumentality to determine the position of the blanks in said device, a cutter-support mounted opposite the exposed portion of the nut-blank and adapted to move toward and away from the same, and means carried by said support for successively cutting radial slots in the exposed portion of said nut-blank while thus clamped.

3. A device of the nature disclosed comprising, in combination, a device adapted to clamp a nut-blank whereby the crowned portion thereof may be exposed, a stop adapted to be moved across the face of said device to laterally displace a slotted blank and serve as means for forwardly positioning a succeeding blank preparatory to the clamping thereof, a cutter-support mounted opposite the exposed portion of said nut-blank and adapted to move toward and away from the same, a cutter carried by said support, means for periodically moving said cutter into contact with the nut-blank while thus clamped to cut radial slots in the exposed end thereof, and means for turning said nut through a predetermined angle while said cutter is out of contact therewith to present successive portions of said nut-blank to the action of said cutter.

4. A device of the nature disclosed comprising, in combination, a device adapted to clamp a nut-blank whereby the crowned portion thereof may be exposed, an elongated bar slidably mounted at one side of said device, mechanism for longitudinally reciprocating said bar transversely to said device and radially across the face thereof to displace a slotted blank and serve as a positioning stop for the succeeding blank, a cutter-support mounted opposite the exposed portion of said blank and adapted to move toward and away from the same, a cutter carried by said support, means for contacting said cutter with said nut-blank while thus clamped to produce a plurality of equispaced radial slots in the crowned portion thereof, and a feeding-mechanism for supplying said clamping device with nut-blanks.

5. A device of the nature disclosed comprising, in combination, a split collet-chuck having in its end a hexagonal aperture adapted to receive a base-portion of a nut-blank whereby such blank may be clamped in position with its crowned portion exposed, a stop adapted to restrict the extent to which the crowned end of the nut-blank is exposed, a rotating circular cutter mounted opposite the face of said chuck, and means for intermittently advancing said cutter in the direction of the longitudinal axis of said chuck for cutting a plurality of radial slots in such exposed crowned portion.

6. A device of the nature disclosed comprising, in combination, a slit collet-chuck having a hexagonal central aperture adapted to receive and clamp the base-portion of a hexagonal nut-blank, means for feeding blanks to the face of said chuck through the said aperture, means for contracting the sections of said collet-chuck to clamp said nut-blank, a stop adapted to restrict the extent to which the crowned end of the nut-blank is exposed, and a cutter positioned opposite the exposed crowned portion of said nut-blank adapted to cut radial slots in the face thereof.

7. A device of the nature disclosed comprising, in combination, a device for clamping a nut-blank whereby the crowned portion thereof may be exposed, a support pivotally mounted below said device, a cutter rotatably mounted on said device opposite the exposed portion of said nut-blank, an arm for swinging said support toward and away from said device, a stop adapted to momentarily interpose between the cutter and nut-blank to determine the position of the latter, and means for actuating said arm to cause the cutter to be brought into contact with such portion to cut narrow slots therein while said blank is thus clamped.

8. A device of the nature disclosed comprising, in combination, a device adapted to clamp a nut-blank whereby the crowned portion thereof may be exposed, a reciprocating stop adapted to move toward said nut-blank to displace the same after having been slotted and also adapted to move momentarily in front of the succeeding nut-blank to restrict the extent to which the crowned end thereof is exposed, a cutter-support pivotally mounted opposite the exposed portion of said nut-blank to enable the same to be oscillated toward and away from said nut-blank, a cutter having a narrow elongated cutting-edge supported by said cutter-support and adapted to be brought into and out of contact with said nut-blank while thus clamped during the oscillations of said cutter-support, and means for adjustably varying the extent of approach between the cutter and the blank.

9. A device of the nature disclosed comprising, in combination, a device adapted to clamp a nut-blank whereby the crowned portion thereof may be exposed, a reciprocating stop adapted to move toward said nut-blank to displace the same after having been slotted and also adapted to move momentarily in front of the succeeding nut-blank to restrict the extent to which the crowned end thereof is exposed, a cutter-support pivotally mounted opposite the exposed portion of said nut-blank and adapted to swing toward and away from the same, an arm for actuating said cutter-support, adjusting means intervening between said arm and said support, and a circular cutter revolubly mounted on said cutter-support and adapted to cut narrow slots in said nut-blank while thus clamped.

10. A device of the nature disclosed comprising, in combination, a rotatable tubular member terminating in a circular head having in its face a conical seat, a device having an elongated shank extending into the bore of said member and having an enlarged end recessed to receive a nut-blank, means for translating said device to force its end into said conical seat to clamp a nut-blank whereby the crowned portion thereof may be exposed, a stop adapted to restrict the extent to which the crowned end of the nut-blank is exposed, a cutter-support mounted opposite the exposed portion of said nut-blank and adapted to be moved toward and away from the same, and a cutter having a narrow elongated cutting-edge supported by said cutter-support and adapted to be brought into and out of contact with said nut-blank while thus clamped during oscillations of said cutter-support.

11. A device of the nature disclosed comprising, in combination, a rotatable tubular member terminating in a circular head having in its face a conical seat, a device having an elongated shank extending into the bore of said member and having an enlarged end recessed to receive a nut-blank, means for translating said device to force its end into said conical seat to clamp the base-portion of a nut-blank whereby the crowned portion thereof may be exposed, a cutter-support mounted opposite the exposed portion of said nut-blank and adapted to be moved toward and away from the same, a reciprocating stop adapted to move toward said nut-blank to displace the same after having been slotted and also adapted to move momentarily in front of the succeeding nut-blank to restrict the extent to which the crowned end thereof is exposed, a circular cutter revolubly mounted on said cutter-support and adapted to be brought into and out of contact with the nut-blank while thus clamped during the oscillations of said cutter-support to cut narrow slots in said blank, and means acting at the conclusion of each slot-cutting operation to produce a relative displacement between the blank and cutter whereby the slots may be diversely arranged in the blank.

12. A device of the nature disclosed comprising, in combination, a rotatable tubular member terminating in a circular head having in its face a conical seat, a device having an elongated shank extending into the bore of said member and having an enlarged end recessed to receive a nut-blank, means for translating said device to force its end into said conical seat, a cutter-support mounted opposite the exposed portion of said nut-blank and adapted to move toward and away from the same, a cutter carried by said support and adapted to cut radial slots in the exposed portion of said nut-blank while thus clamped during the forward advance of said support, a stop adapted to momentarily interpose between the cutter and nut-blank to determine the position of the latter, and means directly connected with said tubular member to rotate the same for producing a relative angular shift between said blank and cutter at periodic intervals.

13. A device of the nature disclosed comprising, in combination, a forward bearing standard, a rear bearing standard, an elongated tube bearing at one end in the rear standard and extending forwardly through an aperture in the forward standard, a member bearing a tubular shank telescoping the forward end of said tube and terminating in its forward end in a plurality of clamping jaws forming a chuck, a third tubular member telescoping said shank and journaled in said forward standard and terminating in a head forming a chuck-closer for said chuck, means for translating said chuck relatively to both said third member and said tube to contract the jaws thereof, means for feeding a train of nut-blanks through the bore of said tube, whereby said blanks may be successively clamped by said chuck, means for intermittently rotating said chuck to successively bring the nut-blanks into different positions, and means periodically acting on a clamped nut-blank to castellate the same.

14. A device of the nature disclosed comprising, in combination, a revolubly mounted chuck having a central bore and adapted to clamp the base-portion of a nut-blank whereby the crowned portion thereof may be exposed, a hopper for nut-blanks arranged at the rear end of said chuck, a plunger effective to periodically transfer blanks from said hopper to the bore of said chuck, a reciprocating stop adapted to move toward said nut-blank to displace the same after having been slotted and also adapted to move momentarily in front of the succeeding nut-blank to restrict the extent to which the crowned end thereof is exposed, a cutter-support mounted opposite the exposed portion of said nut-blank and adapted to move toward and away from the same, a cutter carried by said support and adapted to be periodically moved into contact with such blank while thus clamped to cut radial slots in the face thereof, and means for rotating said chuck through predetermined angular distances to enable the slots to be differently positioned.

15. A device of the nature disclosed comprising, in combination, a split collet-chuck having a hexagonal central bore, means for feeding hexagonal nut-blanks through said bore whereby the crowned portions of the nut-blanks may be successively projected from the face of said collet-chuck, a reciprocating stop adapted to move toward said nut-blank to displace the same after having been slotted and also adapted to move momentarily in front of the succeeding nut-blank to restrict the extent to which the crowned end thereof is exposed, means for contracting the sections of said collet-chuck to clamp the base-portions of the nut-blanks, a cutter-support mounted opposite the exposed portion of said nut-blank and adapted to move toward and away from the same, and means carried by said support for cutting slots in the crowned portion of said nut-blank while thus clamped.

16. A device of the nature disclosed comprising in combination, a split collet-chuck having a hexagonal central bore, means for feeding hexagonal nut-blanks through said bore whereby the crowned portions of the nut-blanks may be successively projected from the face of said collet-chuck, means for contracting the sections of said collet-chuck to clamp the base-portions of the nut-blanks, and means for cutting slots in the crowned portions of said nut-blanks while thus clamped.

17. A device of the nature disclosed comprising in combination, a split collet-chuck having a hexagonal central bore, means for feeding hexagonal nut-blanks through said bore whereby the crowned portions of the nut-blank may be successively projected from the face of said collet-chuck, means for contracting the sections of said collet-chuck to clamp the base-portions of the nut-blanks, a cutter-support mounted opposite the exposed portion of said nut-blank and adapted to move toward and away from the same, means carried by said support for cutting slots in the crowned portion of said nut-blanks while thus clamped, and a mechanism constructed to intermittently produce an angular shift of 60° between the successive operations of the latter.

18. A device of the nature disclosed comprising in combination, a device for clamping the base-portion of a nut-blank whereby the crowned portion thereof may be exposed, a cutter positioned opposite the exposed portion of said nut-blank, a stop adapted to momentarily interpose between the cutter and nut-blank to determine the position of the latter, means for periodically moving said cutter into contact with the nut-blank to cut radial slots in the exposed end thereof, and means for turning said nut blank while said cutter is out of contact therewith to present successive portions of said nut-blank while thus clamped to the action of said cutter.

19. A device of the nature disclosed comprising in combination, an automatic device adapted to be contracted to clamp the base-portion of a nut-blank whereby the crowned portion thereof may be exposed, a reciprocating stop adapted to move toward said nut-blank to displace the same after having been slotted and also adapted to move momentarily in front of the succeeding nut-blank to restrict the extent to which the crowned end thereof is exposed, and a cutter adapted to be periodically brought into contact with the exposed portion of said nut-blank while thus clamped to cut equispaced angular slots therein.

20. A device of the nature disclosed comprising in combination, a chuck adapted to clamp the base-portion of a nut-blank whereby the crowned portion thereof may be exposed, a cutter positioned opposite such exposed crowned portion and adapted to be periodically oscillated in a fixed path into contact with such blank while thus clamped to cut a radial slot in the face thereof, and a reciprocating stop adapted to move toward said nut-blank to displace the same after having been slotted and also adapted to move momentarily in front of the succeeding nut-blank to restrict the extent to which the crowned end thereof is exposed.

21. A device of the nature disclosed comprising in combination, a split collet-chuck having a hexagonal central bore, means for feeding hexagonal nut-blanks through said bore whereby the crowned portions of nut-blanks may be successively projected from the face of said collet-chuck, means for contracting the sections of said collet-chuck to clamp the base-portions of the nut-blanks, a reciprocating stop adapted to move toward said nut-blank to displace the same after having been slotted and also adapted to move momentarily in front of the succeeding nut-blank to restrict the extent to which the crowned end thereof is exposed, and means for cutting slots in the crowned portions of said nut-blanks while thus clamped.

22. A device of the nature disclosed comprising in combination, a device for clamping the base-portion of a nut-blank whereby the crowned portion thereof may be exposed, a cutter having a narrow elongated cutting-edge arranged opposite the exposed portion of said blank, a stop adapted to momentarily interpose between the cutter and nut-blank to determine the position of the latter, and means for bringing said cutter into contact with the exposed portion of said nut-blank while thus clamped to produce slots in the end thereof.

23. A device of the nature disclosed comprising in combination, a device adapted to clamp the base-portion of a nut-blank whereby the crowned portion thereof may be exposed, a circular cutter rotatably mounted opposite the exposed portion of said nut-blank, a reciprocating stop adapted to move toward said nut-blank to displace the same after having been slotted and also adapted to move momentarily in front of the succeeding nut-blank to restrict the extent to which the crowned end thereof is exposed, and means for advancing said rotating cutter into contact with said blank while thus clamped to cut slots therein and for withdrawing said cutter from said blank to enable the latter to be replaced.

24. A device of the nature disclosed comprising in combination, a split collet-chuck having in its end a hexagonal aperture adapted to receive the base-portion of a nut-blank whereby such blank may be securely clamped in position with its crowned portion exposed, means constructed to automatically shift said chuck in an axial direction to clamp and release the blanks, a reciprocating stop adapted to move toward said nut-blank to displace the same after having been slotted and also adapted to move momentarily in front of the succeeding nut-blank to restrict the extent to which the crowned end thereof is exposed, a cutter-support mounted opposite the exposed portion of said nut-blank and adapted to move toward and away from the same, and a cutter carried by said support and adapted to cut narrow slots in said nut-blank while thus clamped.

25. A device of the nature disclosed comprising in combination, a device having an elongated central aperture adapted to clamp the base-portion of a nut-blank whereby the crowned portion thereof may be exposed, a reciprocating stop adapted to move toward said nut-blank to displace the same after having been slotted and also adapted to move momentarily in front of the succeeding nut-blank to restrict the extent to which the crowned end thereof is exposed, a cutter-support mounted opposite the exposed portion of said nut-blank and adapted to move toward and away from the same, a cutter carried by said support, means for periodically moving said cutter into contact with the nut-blank while thus clamped to cut radial slots in the exposed end thereof, and means for turning said nut through a predetermined angle while said cutter is out of contact therewith to present successive portions of said nut-blank to the action of said cutter, and feeding-mechanism for supplying said clamping-device with nut-blanks through said central aperture.

26. A device of the nature disclosed comprising in combination, a device adapted to clamp the base-portion of a nut-blank whereby the crowned portion thereof may be exposed, a reciprocating stop adapted to move toward said nut-blank to displace the same after having been slotted and also adapted to move momentarily in front of the succeeding nut-blank to restrict the extent to which the crowned end thereof is exposed, a cutter-support mounted opposite the exposed portion of a nut-blank and adapted to move toward and away from the same, a cutter carried by said support and adapted to be brought against the exposed end of said nut-blank while thus clamped to cut radial slots therein, means for turning the clamping device at intervals through predetermined angles to enable said cutter to form differently positioned slots in said nut-blank, and a feeding-mechanism for supplying said clamping-device with nut-blanks.

27. A mechanism of the nature disclosed combining, means for holding a nut-blank with one end exposed, slot-cutting means for propelling a cutting edge radially inward toward and terminating adjacent the center of the blank to throw the resultant bur in the center thereof, and means for intermittently producing a relative angular shift between said blank and said slot-cutting means to enable the latter to cut a plurality of slots in the end of said blank.

28. A mechanism of the nature disclosed combining, means for holding a nut-blank with one end exposed, a rotary cutter positioned at one side of the center of said nut-blank, means for rotating said cutter in a direction such that its cutting teeth move radially inward toward and terminate adjacent the center of the blank whereby the resultant bur will be located adjacent the center, and means for intermittently producing a relative angular shift between said nut-blank and said cutter to enable the latter to cut a plurality of radial slots in said blank.

In testimony whereof I affix my signature, in the presence of two witnesses.

EMILE C. BOERNER.

Witnesses:
ROYAL W. FRANCE,
ALBERT F. NATHAN.